United States Patent [19]

Daloisio

[11] 4,280,640

[45] Jul. 28, 1981

[54] INTEGRAL DOUBLE-WALL CONTAINER

[75] Inventor: Pasquale C. Daloisio, New Hope, Pa.

[73] Assignee: Pennsylvania Pacific Corporation, Warminster, Pa.

[21] Appl. No.: 918,067

[22] Filed: Jun. 22, 1978

[51] Int. Cl.³ .............................................. B65D 5/72
[52] U.S. Cl. ................................... 222/561; 220/1.5; 220/444
[58] Field of Search ............... 222/561, 185, 460, 462, 222/572; 220/444, 1.5

[56] References Cited

U.S. PATENT DOCUMENTS

| 1,351,251 | 8/1920 | Jewell | 222/185 UX |
| 2,799,431 | 7/1957 | Bush et al. | 222/561 X |
| 3,791,547 | 2/1974 | Branscum | 220/444X |
| 3,907,111 | 9/1975 | Levenhagen | 206/511 |
| 3,954,210 | 5/1976 | Luscombe | 222/561 |
| 4,071,160 | 1/1979 | Vick | 220/444 |

FOREIGN PATENT DOCUMENTS 2351027  12/1977  France ................................... 220/444

Primary Examiner—H. Grant Skaggs
Attorney, Agent, or Firm—Harding, Earley & Follmer

[57] ABSTRACT

An integral double-wall container, made of a synthetic plastic, for handling bulk materials such as liquids and powder, and adapted to be lifted and moved by means of a forklift truck. An integral one-piece double-wall hopper bin for dispensing liquid and powder. A method of making integral double-wall containers and hopper bins by rotational molding.

3 Claims, 9 Drawing Figures

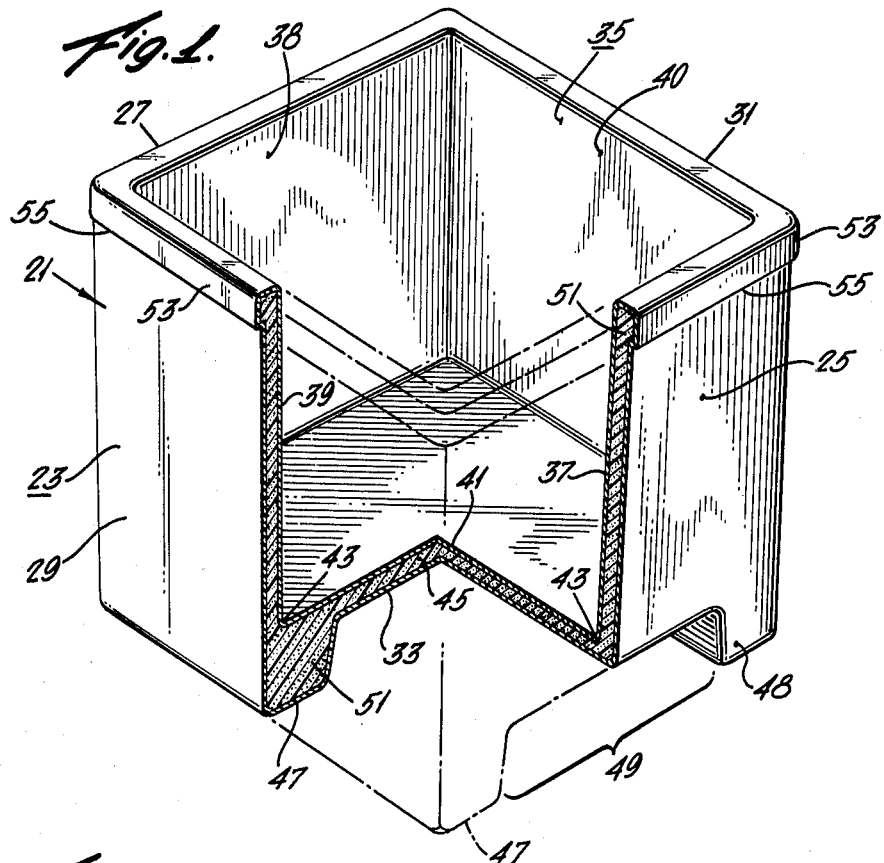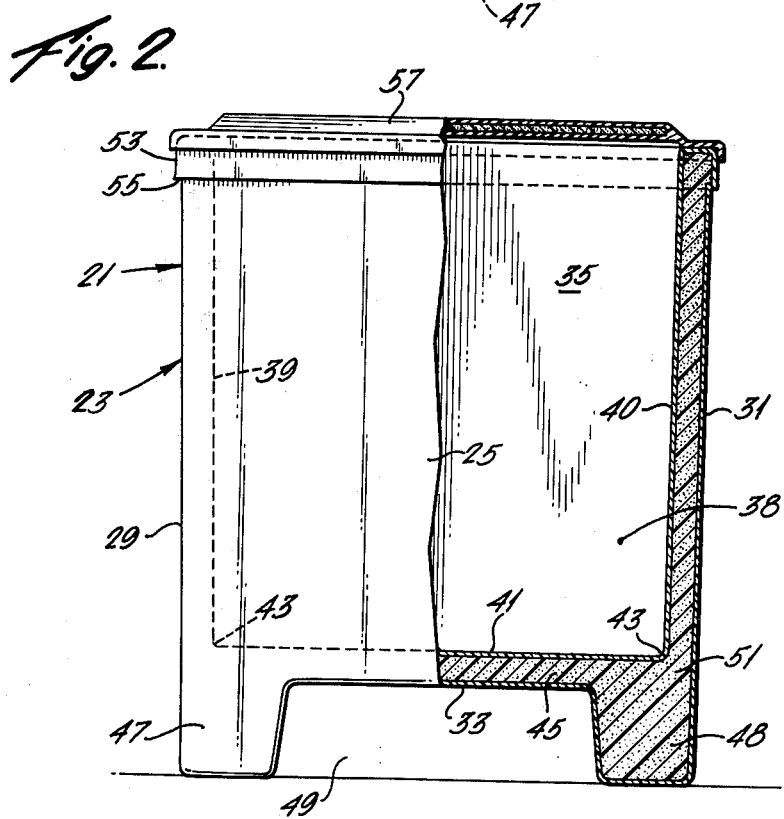

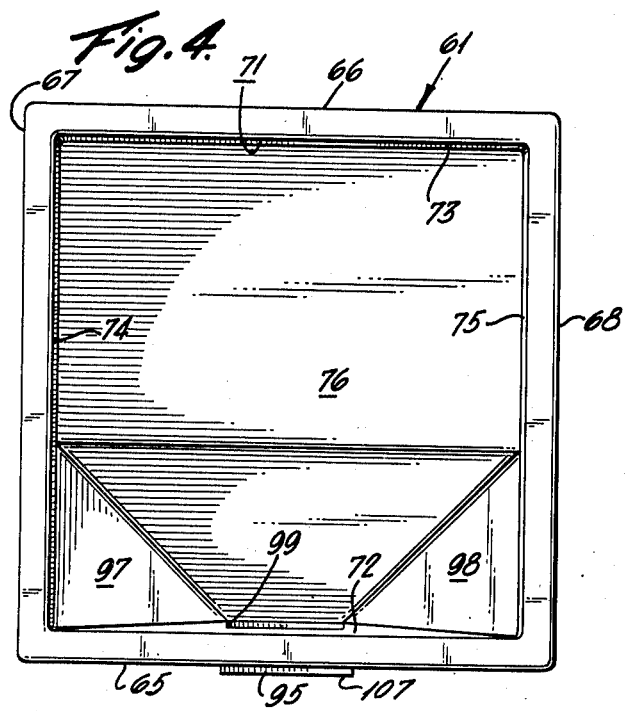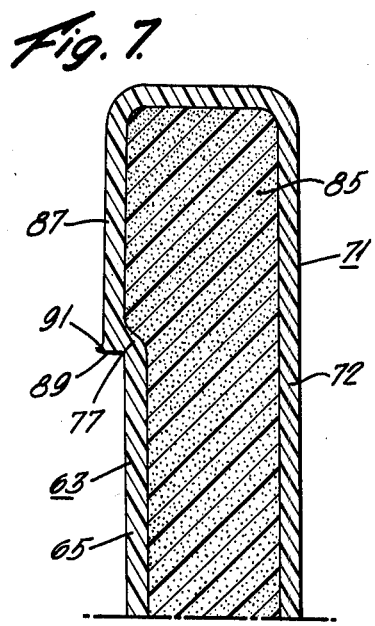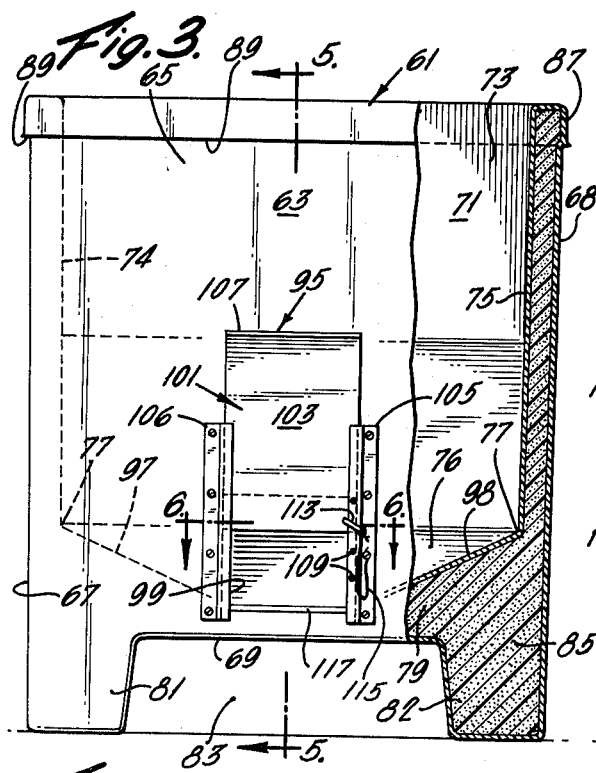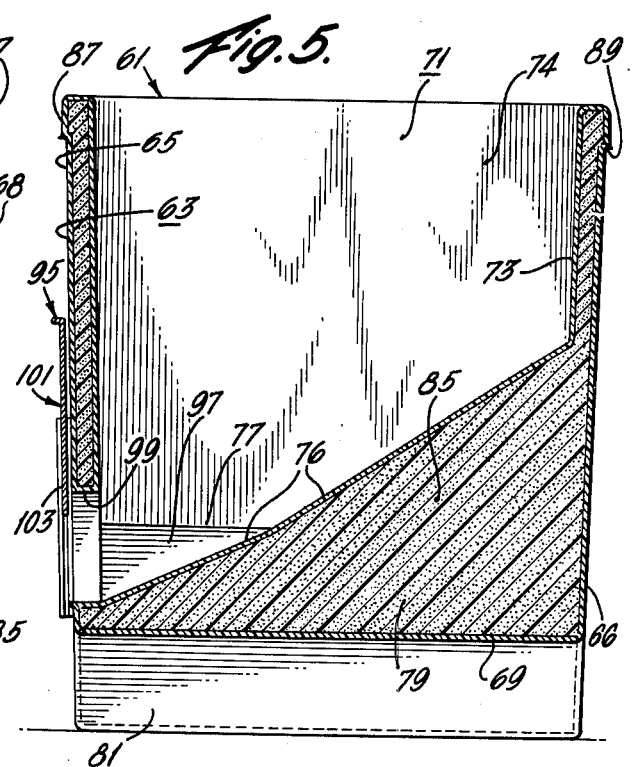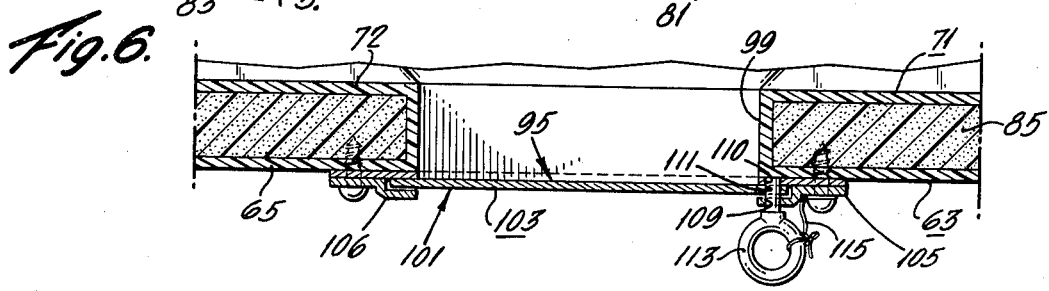

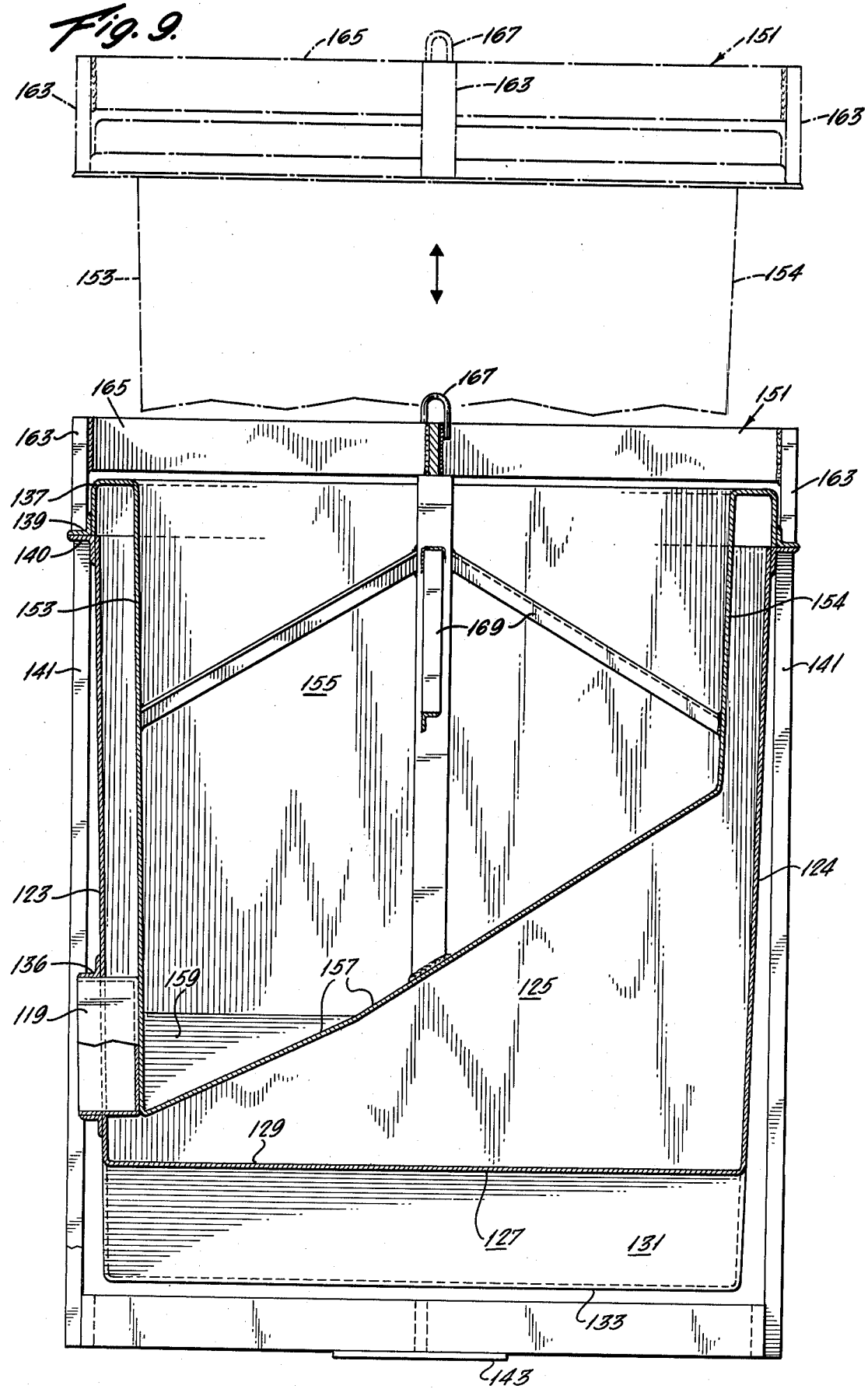

INTEGRAL DOUBLE-WALL CONTAINER

BACKGROUND OF THE INVENTION

This invention is concerned with containers, bins, and hopper bins for use with bulk materials such as liquids, and powders like abrasives, sugar, Chicklet chewing gum, and so on. Such containers are rather large, with one such bin being about 45 inches high, 39 inches wide, and 40 inches deep.

Conventional hopper bins are made of galvanized metal, and once the galvanizing wears off, the bins start to rust and deteriorate. Also, such galvanized metal bins are easily dented. The dents can be fixed, but fixing them is a rather expensive proposition. Moreover, metal and galvanized metal bins are undesirable in some applications such as in handling food or other contents which may be contaminated by the metal.

There has existed a demand or a need for bins and hopper bins made of plastic. However, conventional plastic bins include legs that retain a portion of the powder contents and are hard to clean. I have tried a flat false bottom welded near the bottom of a plastic bin, but false bottoms when made of polyethylene, for example, are not easily welded to the sidewalls of the bin, and any holes in the weld permit contents to enter the space below the false bottom and prevent cleaning.

Instead of a false bottom, I have tried to fill the hollow legs of a polyethylene bin with polyethylene or urethane so as to eliminate the problem of cleaning out the legs, but this has also proved unsatisfactory.

I have also tried a removable false bottom in a polyethylene bin to cover the hollow legs of the bin, but customers objected because removing the false bottom for cleaning the legs was time consuming and otherwise undesirable.

There is a considerable demand for a bin and a hopper bin having a smooth bottom, without cracks and without holes, that is easily cleaned, and that has no metal on the inside of the bin that might contaminate its contents.

SUMMARY OF THE INVENTION

This invention solves the problems of the prior art by providing an integral double-wall container made of polyethylene, and a method of making a container that avoids welding and its attendant difficulties. The invention also provides such a bin which may be handled with a forklift. The invention also provides an inner bottom panel that slopes towards a discharge or dispensing opening or door in the bottom of a hopper bin.

BRIEF DESCRIPTION OF THE DRAWINGS

FIG. 1 is a view in perspective, partly cut away, of an integral double-wall container constructed in accordance with this invention;

FIG. 2 is a view in side elevation of the container of FIG. 1;

FIG. 3 is a view in front elevation, partly cut away, of an integral one-piece double-wall hopper bin constructed in accordance with this invention;

FIG. 4 is a view in top plan of the hopper bin of FIG. 3;

FIG. 5 is a view in section of the hopper bin of FIG. 3 taken as indicated by the lines and arrows 5—5 that appear in FIG. 3;

FIG. 6 is an enlarged view in section taken as indicated by the lines and arrows 6—6 in FIG. 3;

FIG. 7 is a fragmentary view in section of the upper portion of the bin wall;

FIG. 9 is a view in section of the mold of FIG. 8 taken as indicated by the lines and arrows 9—9 in FIG. 8.

DETAILED DESCRIPTION OF THE DRAWINGS

Figure 8:
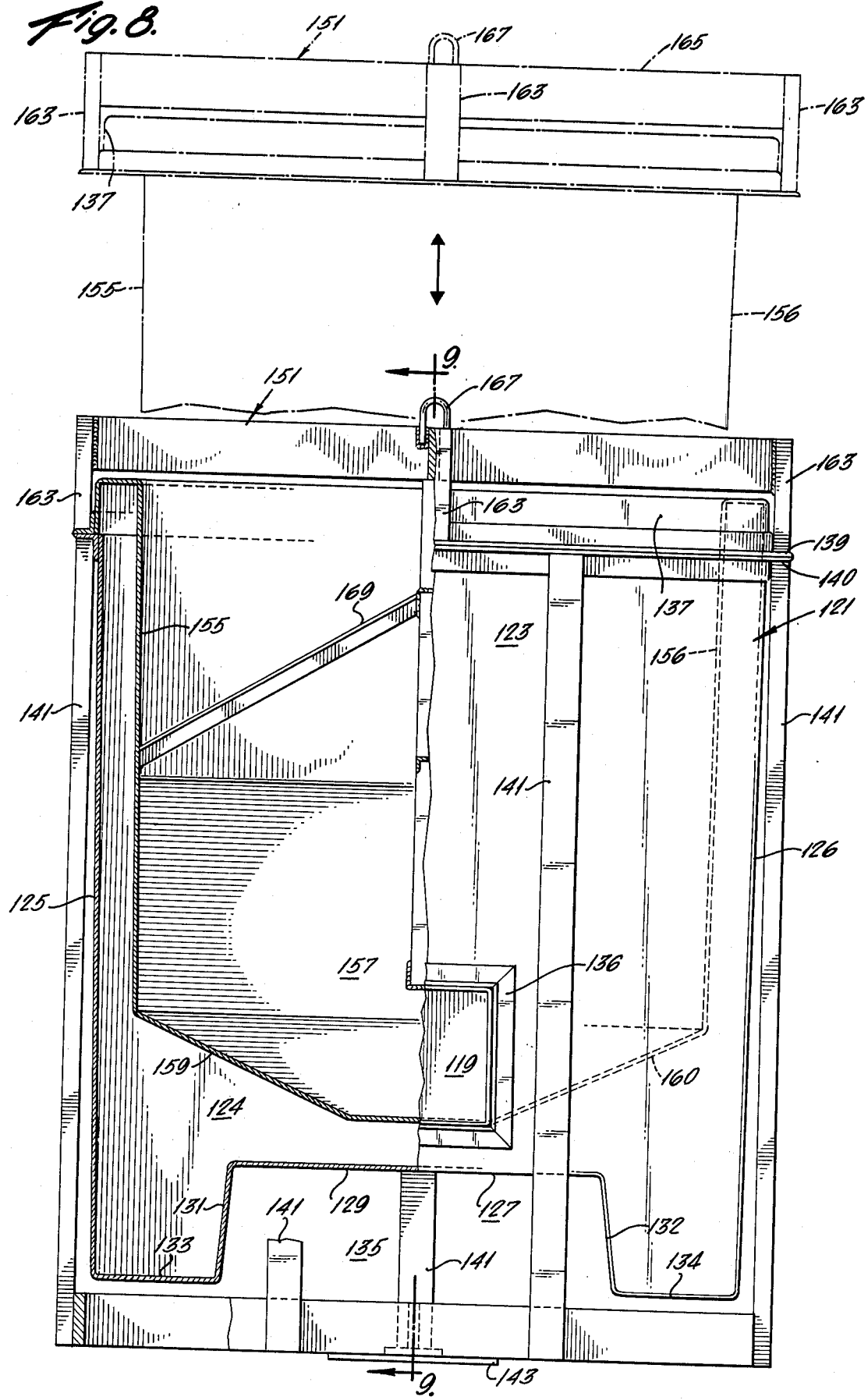
FIG. 8 is a view in front elevation, partly cut away, of a mold for making the hopper bin.

Turning now to the drawings selected for illustrating the invention, there is shown an integral double-wall container 21 comprising an outer shell 23 including a front wall 25 and a rear wall 27 connected by a pair of sidewalls 29, 31 and a bottom panel 33 connecting the bottom of all walls.

An inner shell 35 is integrally connected to outer shell 23 and includes a front wall 37 and a rear wall 38 connected together by a pair of sidewalls 39, 40 with a bottom panel 41 connecting the bottoms of all walls 37–40.

Inner bottom panel 41 is smooth and flat and without depressions that might retain contents of the container and make cleaning difficult. Connection 43 between inner bottom panel 41 and the inner walls 37–40 is smooth and continuous and integral with the bottom panel 41 and the walls 37–40, and is without welds and without openings that would permit passage of the contents of the bin into a false bottom space 45 between the inner and outer shells 35, 23.

Container 21 is integral and is one-piece and is made of a synthetic plastic, preferably polyethylene.

Container 21 includes material handling means for permitting the handling of the container 21 with a forklift truck, for example, and such material handling means comprises a pair of legs 47, 48 depending from outer bottom panel 33 with a space 49 therebetween adapted to receive the tines of a forklift truck.

Container 21 may be provided with heat insulating material 51, preferably urethane foam, between outer and inner shells 23, 35 so that the contents of container 21 are protected against hot and cold temperatures outside the container.

A hand-grasp ridge 53 is formed around the top of the walls of the container 21 and the ridge 53 includes a shoulder 55 that projects outwardly from the outer shell 23. A lid 57 is provided and is adapted to fit over and cover the top of container 21.

Turning now to the embodiment of the invention shown in FIGS. 3 to 7, there is shown a container comprising an integral one-piece double-wall hopper bin 61 which is adapted for use with liquids and with powdered materials such as abrasives and the like. Double-wall hopper bin 61 comprises an outer shell 63 that includes a front wall 65 and a rear wall 66 connected by a pair of sidewalls 67, 68 and a bottom panel 69 connecting the bottoms of all walls 65–68.

Hopper bin 61 also includes an inner shell 71 that has a front wall 72 and a rear wall 73 connected by a pair of sidewalls 74, 75 and a bottom panel 76 connecting the bottoms of walls 72–75. The inner bottom panel 76 is smooth and flat and is without depressions that might retain the powder contents of hopper bin 61 and make cleaning difficult. The connection 77 between the inner bottom panel 76 and the inner walls 72–75 is smooth and continuous and integral and without welds and without openings that would permit passage of the powder contents of the bin 61 into false bottom space 79 between the inner shell 71 and the outer shell 63.

Hopper bin 61 is made of a synthetic plastic, preferably polyethylene, and includes material handling means for lifting hopper bin 61 with a forklift truck, said material handling means comprising a pair of legs 81, 82 that depend from the outer bottom panel 69 and have a space 83 between them adapted to receive the tines of a forklift truck.

Heat insulating material 85 may be provided between the outer shell 63 and inner shell 71 of hopper bin 61 so that the contents of the bin 61 are protected against hot and cold temperatures outside the hopper bin 61.

A hand-grasp ridge 87 is formed around the top of the walls of hopper bin 61 and ridge 87 includes a shoulder 89 that projects outwardly from the outer shell 63 for more easily pulling the bin 61 from the mold by grasping the ridge 87 and shoulder 89. Any flash 91 formed in the molding operation between the outer and inner mold extends from the shoulder 89 and is easily removed or trimmed by scraping it smooth with a sharp putty knife.

A lid 57, as shown in FIG. 2, may be provided and is adapted to fit over and cover the top of hopper bin 61.

Rear inner wall 73 is shorter than front inner wall 71, and bottom inner panel 76 slopes downwardly toward the bottom of front inner wall 72 toward dispensing means 95. Inner bottom panel 76 is also provided with bottom slant portions 97, 98 that slope toward dispensing means 95 so as to direct the contents of the hopper bin toward those dispensing means.

Dispensing means 95 is located near the bottom of front walls 65, 72 for dispensing the powdered contents from the hopper bin 61 as the powder flows downwardly over the smooth inner bottom panel 76.

Dispensing means 95 includes a discharge opening 99 molded in outer and inner front walls 65, 72, and closure means 101 positioned over discharge opening 99 for opening and closing the discharge opening to dispense the contents of the hopper bin 61 when desired. Closure means 101 includes a slide gate 103 that is slidably mounted in a pair of slide tracks 105, 106 mounted one on each side of discharge opening 99. Handle and stop means are provided on slide gate 103 for grasping the gate to raise and lower it and for acting as a stop when the gate is closed. Such handle and stop means includes a handle flange 107 that extends outwardly from the top of gate 103 and is adapted for grasping and is also adapted to act as a stop since it abuts against the top of the slide tracks 105, 106 when in closed position.

Stop means are also provided for holding the slide gate 103 in open position when desired, and said open position stop means comprise a matching series of holes 109, 110 in the front and rear members of slide track 105, and a hole 111 in gate 103, with a locking pin 113 adapted for insertion through the matching holes 109, 110 and gate hole 111 to hold the gate 103 in a desired position relative to the slide tracks. A flexible cord 115, which may be a chain or a cable, is provided for attaching pin 113 to the hopper bin 61 to keep the pin from getting lost.

Hopper bin 61 includes means for preventing sticking of gate 103 by preventing the powder contents of the bin from getting between the rear surface of gate 103 and the outer shell 23 of container or bin 61. Such means comprises a knife-edge ledge 117 that projects from the outer front wall 65 of hopper bin 61 below the discharge opening 99 and is adapted to contact the rear surface of gate 103 when the gate is closed so as to prevent small particles of the contents from sliding through between outer shell 63 and the gate, and to prevent larger particles from jamming between the gate and outer shell 63 and making it difficult to slide the gate.

The method of making the integral double-wall container of the present invention is by rotational molding, and comprises the steps of placing an outer mold into position, placing an inner mold into position inside the outer mold, inserting a powder of synthetic plastic into the space between the molds, heating the powder so that it melts, rotating the mold so that the melted plastic powder falls by gravity onto the surfaces of the outer and inner molds to form an integral double-wall container, allowing the plastic to cool and set, removing the inner mold from the outer mold, and removing the container from the outer mold.

The method also includes the steps of removing any flash 91 from the container that may have occurred at the parting line between the outer and inner mold which extends from shoulder 89.

In making the hopper bin 61, the method also includes the steps of placing an exit-opening plug 119 into an opening in the outer mold so that the plug contacts the inside mold snugly, and forming the container discharge opening 99 around the plug 119 while rotating the combined mold.

Containers 21 and hopper bins 61 are integral units made by rotational molding, a technique that is usually used in making balls, such as basket balls. The inventive method is unusual in that I am molding on both sides of the mold, i.e., on the inner surface of the outer mold and on the outer surface of the inner mold.

FIGS. 8 and 9 show an outer mold 121 comprising front wall 123, rear wall 124 connected together by sidewalls 125 and 126. The bottom of the walls are connected together by a bottom 127 that includes bottom panel 129, leg upright portions 131, 132 and leg bottom portions 133, 134. Leg bottom panel 129 and leg upright portions 131, 132 form a space 135.

A frame 136 is formed in front wall 123 and is adapted to hold the plug 119 that forms discharge opening 99 in hopper bin 61.

Ridge forming member 137 of inner mold 151 is provided at the top of outer mold 121, together with inner mold angles 139 and outer mold angles 140. Tubes 141 provide structural support, and a spider 143 holds the mold 121 onto the arms of a rotational molding machine.

Inner mold 151 comprises a front wall 153, and a rear wall 154 connected together by sidewalls 155, 156. The bottom edges of walls 153–156 are connected together by a bottom 157 that slants downwardly from rear wall 154 towards front wall 153 and includes side slant portions 159, 160. Ridge forming members 137 are provided at the top of the walls and are connected by angles 139 and members 163 to plates 165. Eyes 167 are provided at the top of mold 151 for pulling inner mold 151 out of outer mold 121 when desired. Inner mold 151 is strengthened by tubular supports 169.

Hopper bin 61 is provided with a smooth interior and its floor is slanted so as to slide the contents by gravity to discharge opening 99 because the floor tapers towards the discharge opening 99.

Containers 21 and hopper bins 61 are provided with a pair of legs having a space therebetween for two way entry of forklift tines. Containers 21 and bins 61 when made of a resilient plastic such as polyethylene, take a blow that deforms it but then bounces right back into its original shape because of its resiliency, and this is an advantage over comparative containers and bins made of metal.

It is difficult to mold the discharge opening 99 by the rotational molding method because of the difficulty in rotating enough plastic material to the area to form discharge opening 99. Hot air expands and tends to create a vacuum around the molded discharge opening 99. This problem was solved by venting the opposite wall of the mold so as to remove the vacuum around the molded opening 99.

Containers 21 and bins 61 may be sold with or without a cover, as desired. Also, a dust cover may be provided with vent holes drilled around its periphery.

Upper ridge 87 and shoulders 89 are provided for grasping to more easily pull the hopper bin 61 out of the mold, and a one inch taper is provided on each mold wall to more easily pull the hopper bin 61 out of the mold. The thickness of the outer wall of hopper bin 61 is preferably two hundred thousands of an inch, and the thickness of the inner walls is preferably about one hundred eighty thousands of an inch.

Containers 21 and hopper bins 61 when provided with a cover and with heat insulation material in the space between outer and inner walls become refrigerated containers adapted to hold materials and keep those materials at a hot or cold temperature, as desired.

Insulating foam, such as polyurethane, is inserted into the space between the outer and inner skins of containers 21 and hopper bins 61 by inserting as many needles as may be necessary through the outer or inner skin and injecting the foam materials into the space. When sufficient foam material has been inserted into the space and the foam rises to the desired height, the punctures made by the needles may be sealed by welding.

In one method of filling the space between the outer and inner skins with heat insulation material, holes are drilled in four corners of the legs, needles generally known as spears are inserted through the holes, and a two part material is inserted into the wall space. An exothermic reaction takes place and the material starts to foam and fill the space. Then the drilled holes are welded over with polyurethane so that the container or bin is adapted for use with food.

The method of the invention is very efficient since I mold the outer skin on the inner surface of an outer mold, and mold the inner skin on the outer surface of an inner mold, simultaneously.

There are many advantages in handling bulk powder or liquid material with bins instead of with bags or drums.

The urethane foam in the space between the outer and inner skins of containers 21 and hopper bins 61 provide stiffness and strength, in addition to heat-insulation properties.

I claim:
1. An integral double-wall container comprising
an outer shell including a front and a rear wall connected by a pair of sidewalls and a bottom panel connecting the bottoms of all walls,
an inner shell including a front and a rear wall connected by a pair of sidewalls and a bottom panel connecting the bottoms of all walls,
with the inner bottom panel being smooth and flat and without depressions that might retain contents of the container and make cleaning difficult,
and a connection between the inner bottom panel and the inner walls being smooth and continuous and integral and without welds and without openings that would permit passage of contents into a false bottom space between said inner and outer shells,
said container being made of a synthetic plastic,
said rear inner wall being shorter than said front inner wall,
said bottom inner panel sloping downwardly to the bottom of said front inner wall,
and dispensing means at the bottom of said front walls for dispensing the contents from the container as it flows downwardly over the smooth inner bottom panel,
whereby said container forms an integral one-piece double-wall hopper bin for liquid and for powdered material such as abrasives and the like,
a discharge opening molded in the outer and inner front walls,
closure means positioned over the discharge opening for opening and closing the discharge opening to dispense the contents of the hopper bin when desired,
a slide gate,
a pair of slide tracks mounted one on each side of the discharge opening with the slide gate slidable therein,
handle and stop means on said gate for grasping the gate to raise and lower it and for acting as a stop when the gate is closed,
said handle and stop means including a flange extending outwardly from the top of said gate for grasping as a handle and for abutting the top of said slide tracks to act as a stop.
2. The container of claim 1, including open stop means for holding the slide gate in open position when desired.
3. The container of claim 2,
said open position stop means comprising matching holes in the front and rear members of one of the slide tracks and a hole in the gate,
a pin for insertion through said holes to hold the gate in position relative to the slide tracks,
and a flexible cord attaching the pin to the container to keep the pin from getting lost.

* * * * *